LANE & COLTER.
Wheel-Cultivator.
No. 62,344.
Patented Feb 26, 1867.
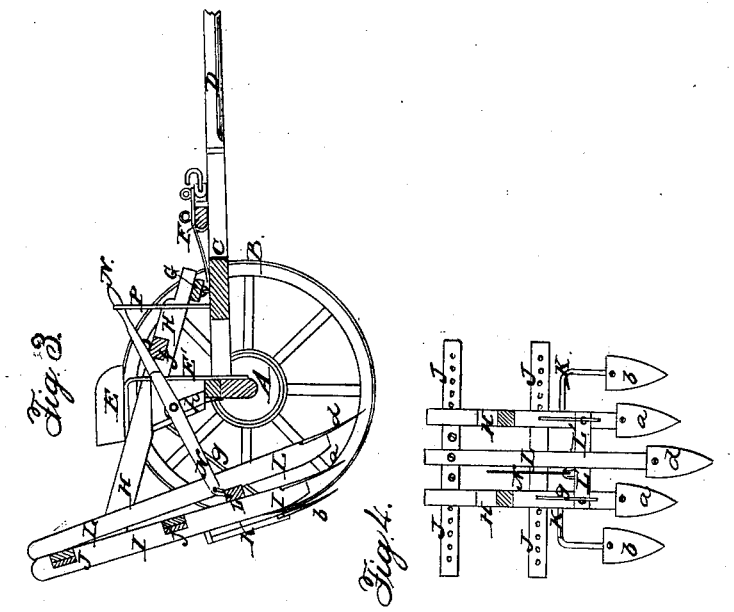
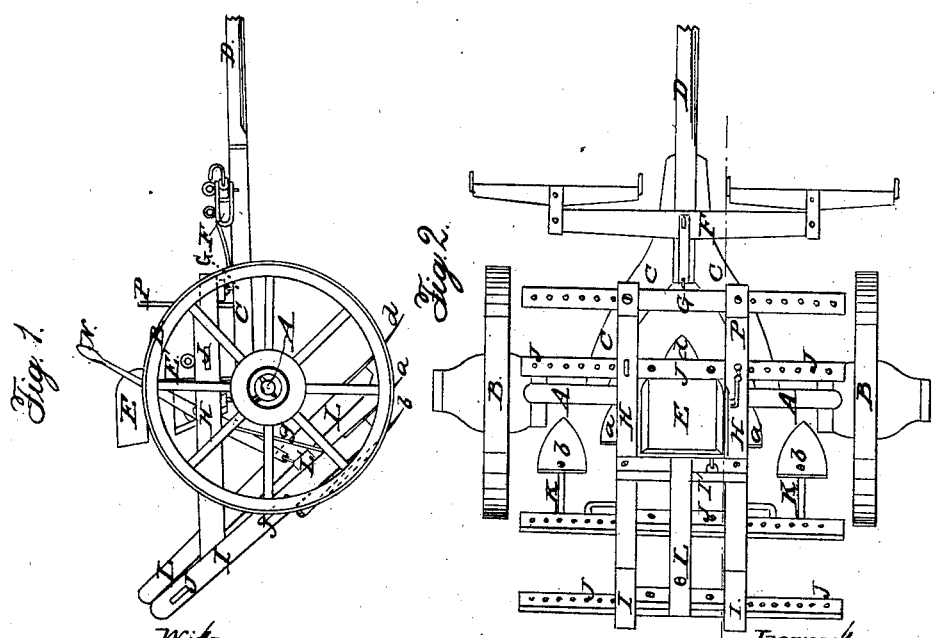

United States Patent Office.

WILLIAM B. LANE AND WILLIAM COULTOR, OF ORGAN SPRING, INDIANA.

Letters Patent No. 62,344, dated February 26, 1867.

IMPROVEMENT IN CULTIVATORS.

*The Schedule referred to in these Letters Patent and making part of the same.*

TO ALL WHOM IT MAY CONCERN:

Be it known that we, W. B. LANE and W. COULTOR, of Organ Spring, Washington county, State of Indiana, have invented a new and improved Cultivator; and we do hereby declare that the following is a full, clear, and exact description thereof, reference being had to the accompanying drawings, making a part of this specification, in which—

Figure 1 is a view of one side of the cultivator.

Figure 2 is a top view.

Figure 3 is a longitudinal section taken in the vertical plane indicated in fig. 2 by the red line $x\ x$.

Figure 4 is a front view of the shovel frame with five shovels attached.

Similar letters of reference indicate corresponding parts in the several figures.

This invention relates to an improvement on that class of cultivators in which the shovel-carrying frame is mounted upon a carriage, and so applied that the driver, whilst riding upon the machine, can raise or depress the shovels at pleasure. The invention consists in a laterally extensible shovel frame of a peculiar construction, which is adapted for having secured to it several shovels in a gang, and which is pivoted in front of the axle of a two-wheel carriage in such manner that it can be raised or depressed at pleasure, said shovel frame being so arranged that the downward pressure upon it, when the shovels are in operation, will be sustained upon said axle—all as will be hereinafter explained.

To enable others skilled in the art to understand our invention, we will describe its construction and operation.

In the accompanying drawings, A represents the axle of the transporting-wheels B B, and C represents the hounds of the draught-pole D, all of which parts are constructed strong and substantial. E represents the driver's seat, which is secured to an upright standard, E', projecting up from the centre of the axle A. F is the double-tree, to which the horses that draw the machine are attached. G represents a transverse bar, which is connected by suitable joints to the hounds C in front of the axle A, as shown in figs. 1, 2, and 3; and to this bar the longitudinal beams H H are secured, which latter extend back over the axle A, and project out a suitable distance in rear of the same. The rear ends of the longitudinal beams H are rigidly secured to other beams, I I, which latter incline backward, and have shovels, $a$, suitably secured upon their lower ends, as shown in figs. 2 and 4. The beams H and I are connected together by several transverse braces, J, which pass through said beams, and are connected to them by pins or movable bolts. The braces J are all of sufficient length to allow of the lateral extension of the beams H and I, so as to admit of adjusting the shovels at any desired distance apart. Several holes are made in each one of the lateral braces J, and also in the rocking or hinged bar G, for the purpose of receiving the bolts or pins which secure the beams to them. On the outer sides of the inclined beams I I, right-angular bars, K K, are securely attached, but so attached that they can be removed when desired; and to the lower ends of these bars K shovels, $b\ b$, are suitably secured, so as to be slightly in rear of and to one side of the shovels $a\ a$. L represents a shovel-beam, which carries on its lower end a shovel, $d$, and which is secured rigidly to a transverse bar, L', nearly at the lower ends of the beams I, and also to the uppermost transverse brace J of these beams. This shovel $d$ is arranged forward of the shovels $a\ a$, and at an intermediate point between them. In order to strengthen the shovel-frame H I, brace-rods, $g\ g$, are used, which are arranged in rear of the axle A, as shown in the drawings. For the purpose of enabling the driver, whilst sitting upon his seat E, to raise the shovels out of the ground, a lever, N, is employed, which is pivoted to a standard, $h$, on the axle A, and connected to the shovel-frame by means of a link. In front of the driver's seat, and projecting up from the hounds C, is a rod, P, having a hook upon its end, which is used for holding the lever N, and its frame H I, in a position shown in fig. 3, with the shovels free from the ground. For ploughing corn and cotton, the centre shovel $d$ should be removed; and by removing the two outside shovels $b\ b$ and said central shovel $d$, and adjusting the shovel-frame so as to set the two shovels $a\ a$ the proper distance apart, corn and cotton ground can be run off, two rows at a time.

It will be seen from the above description that we combine with a two-wheel carriage, upon which the driver rides, a vibrating and laterally extensible shovel-frame, which is adapted for carrying five shovels in a gang, any one of which shovels can be removed at pleasure, as the work required may demand. It will also be seen that the shovel-frame is so constructed as to afford great strength, and so arranged that the shovels will be located beneath the axle A, and the downward pressure upon them will be sustained upon this axle without any tendency to throw up the draught-tongue.

Having described our invention, what we claim as new, and desire to secure by Letters Patent, is—

1. Combining, with a two-wheel carriage, a shovel-carrying frame which is adapted for carrying five shovels, $a\ a$, $b\ b$, and $d$, and which is composed of vertically vibrating beams H H, I I, connected together by transverse braces J, so as to be laterally adjustable, substantially as described.

2. Arranging a vertically and laterally adjustable shovel-frame, which is constructed as described, upon a two-wheel carriage, in such manner that the shovels will be located beneath and in a vertical line, or nearly so, with the axle A, substantially as described.

WILLIAM B. LANE,
WILLIAM COULTOR.

Witnesses:
GEORGE W. NEWLAN,
BURRILL B. ROBERTS.